United States Patent [19]

Omori et al.

[11] 4,121,223

[45] Oct. 17, 1978

[54] INK JET RECORDING APPARATUS WITH AN IMPROVED INK SENSOR

[75] Inventors: Hideyuki Omori; Osamubo Otubo, both of Ibaraki; Yoshio Ohuchi, Hori, all of Japan

[73] Assignee: Hitachi, Ltd., Japan

[21] Appl. No.: 722,031

[22] Filed: Sep. 10, 1976

[30] Foreign Application Priority Data

Sep. 19, 1975 [JP] Japan ............................... 50-112609

[51] Int. Cl.$^2$ ............................................ G01D 15/18

[52] U.S. Cl. ............................................ 346/75

[58] Field of Search ............................................ 346/75

[56] References Cited

U.S. PATENT DOCUMENTS

| | | | |
|---|---|---|---|
| 3,836,912 | 9/1974 | Ghougasian et al. | 346/75 |
| 3,852,768 | 12/1974 | Carmichael et al. | 346/75 |
| 3,886,564 | 5/1975 | Naylor et al. | 346/75 |
| 3,953,860 | 4/1976 | Fujimoto et al. | 346/75 |
| 3,977,010 | 8/1976 | Erickson et al. | 346/75 |

*Primary Examiner*—George H. Miller, Jr.
*Attorney, Agent, or Firm*—Craig & Antonelli

[57] ABSTRACT

Ink jet recording apparatus has an ink sensor which detects charges on charged ink droplets emitted from a nozzle of the ink jet recording apparatus and emits electric signals for controlling the above apparatus. The ink sensor comprises a pair of induction plates disposed with a separation distance, and a pair of grounded plates each of which is mounted on each of the induction plates through an electric insulator. The sensor is disposed such that flying paths of the ink particles to be detected are between the pair of induction plates. In the induction plates, current is induced at every time when each of the charged ink droplets pass between the pair of induction plates thereby providing electric signals for controlling.

11 Claims, 4 Drawing Figures

INK JET RECORDING APPARATUS WITH AN IMPROVED INK SENSOR

BACKGROUND OF THE INVENTION

This invention relates to an ink jet recording apparatus with an improved ink sensor, particularly to an ink sensor which is used for detecting disorder in recording.

In an ink jet recording apparatus, ink under pressure is vibrated with a constant frequency at a nozzle of the apparatus. Therefore, the ink emitted from the nozzle becomes droplets of a constant size with a regular interval. The ink droplets are charged by a charging plate in accordance with electric voltage applied thereto.

In this kind of ink jet recording apparatus a problem may occur often such that the phase between emission of ink droplets out of the nozzle and charging thereof does not accord, which may result in disorder in recording. Accordingly the phase should be corrected.

In order to detect disorder in record, a microphone, which is disposed in a flying path of the ink droplets to be detected and converts impinging energy of the ink particles into an electric signal, has been used. The microphone, however, has the following defects or disadvantages:

1. Since the ink droplets impinge directly with a diaphragm of the microphone, it needs to be completely water-proof, which results in difficulty of manufacture thereof and raising the cost thereof.

2. Since the deflection amount of the ink droplets charged is small, it is necessary to construct the microphone into a small size, which is difficult in manufacture thereof.

3. A vibrating face of a conventional microphone varies in sensibility according to the position at which the ink droplets impinge therewith, and it is necessary to adjust the microphone such that ink droplets impinge with the highest sensibility position of the microphone. Therefore the adjustment becomes difficult.

Further known is an ink sensor comprising an induction rod of which one end is disposed to face a flying path of ink droplets to be detected and a pair of shielding plates between which the end of the induction rod is disposed. The shielding plates each are provided with a hole through which the ink droplets pass. In this sensor, it is difficult to adjust the position of the sensor relating to the ink jet recording apparatus without contacting the flying ink droplets with the shielding plates.

SUMMARY OF THE INVENTION

An object of the invention is to provide an ink sensor which is able to detect ink droplets without contacting the sensor with the ink droplets.

Another object of the invention is to provide an ink jet recording apparatus with an ink sensor in which adjustment of the position of the sensor relative to a flying path of the ink droplets is easy.

Further another object of the invention is to provide an ink jet recording apparatus with an ink sensor, which sensor has high sensibility and is simple in construction.

The present invention is characterized by an ink sensor comprising induction means including a pair of faces disposed such that ink droplets to be detected pass through therebetween and shielding means mounted on the induction means through insulating means for shielding electric noise.

DESCRIPTION OF THE PREFERRED EMBODIMENT

Figure 1:
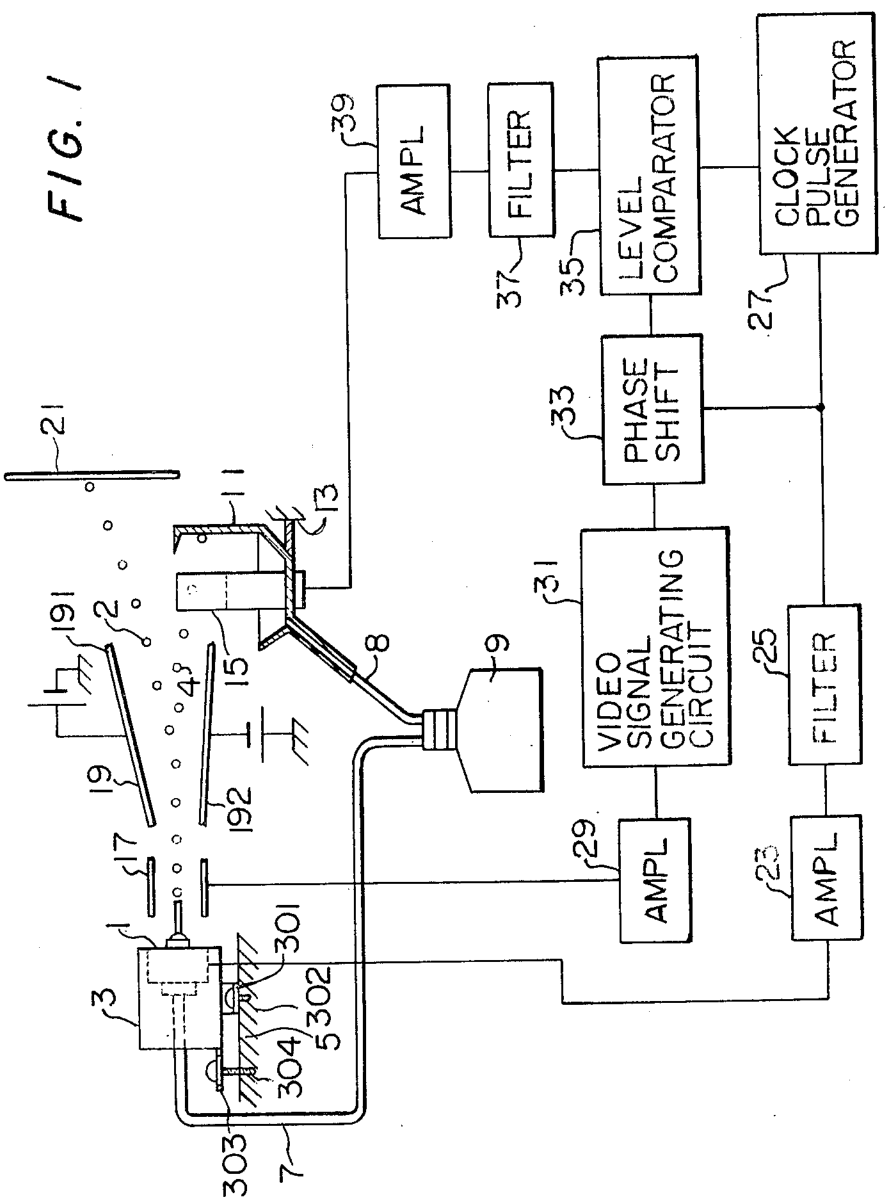
FIG. 1 is a schematic view of an ink jet recording apparatus employing a sensor according to the present invention.

Referring to FIG. 1, an ink jet recording apparatus employing an ink sensor according to the present invention will be described hereinafter in detail.

A nozzle 1 emitting ink is fixed to a casing 3, which casing 3 is fixed to a stationary portion 5 at brackets 301,303. The bracket 301 has an elliptical hole in which a screw 302 is inserted and fixes the casing 3 to the stationary portion 5 so that the nozzle 1 can be adjusted axially of the nozzle 1. The bracket 303 also has an elliptical hole in which a screw 304 is inserted. By the screw 304, the nozzle 1 is fixed to the stationary portion 5 so that angle of the jet portion of the nozzle can be adjusted.

The nozzle 1 is provided with a transducer such as a piezo-electric crystal which vibrates the nozzle receiving electric signals. The electric signal is transmitted from an amplifier 23 after being generated by a clock pulse generator 27, converted into sine curve by a filter 25 and amplified by the amplifier 23.

Figure 2:
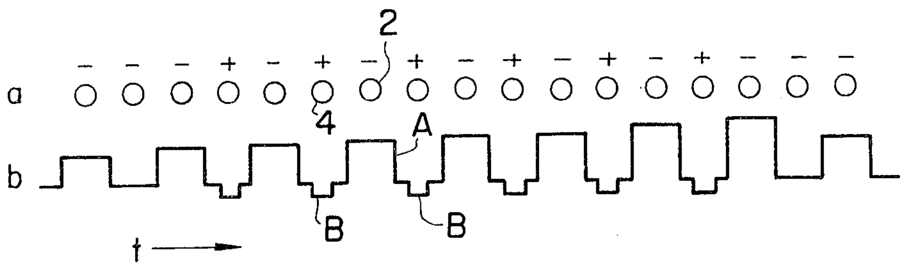
FIG. 2 is a diagram showing a relation between ink droplets emitted and electric signals including video signals and phase detecting signals.

Ink under pressure from a reservoir 9 is emitted from the nozzle 1 and made into droplets synchronized with vibration frequencies of the electric signals. The droplets are electrically charged by charging plates 17 to which electric signals generated by a signal generating circuit 31, as shown in FIG. 1, are applied through an amplifier 29. The signals comprise synthesized video signal portions A and phase detecting portions B, as shown in FIG. 2. The video signal A of the signal corresponds to alternate droplets from the nozzle 1 and apply voltage (positive) according to the video signal A to the droplet in case of presence of voltage in the video signal. The other alternate droplets correspond to the phase detecting signal B applying negative voltage to the droplets to appear repeatedly as a period of alternate successive 6 droplets. The droplets charged thus are deflected by deflection plates 19. In one 191 of the deflection plates 19 positive voltage is applied and in the other 192 negative voltage is applied. Accordingly, droplets carrying video signals impinge with recording medium such as paper, articles or the like, and droplets carrying phase detecting signals or droplets not charged impinge with a gutter 11. The gutter 11 is fixed to a stationary portion 13 of the ink jet recording apparatus. Ink held here is returned to the ink reservoir 9 through a tube 8. The droplets carrying the phase detecting signals are detected electrically by an ink sensor 15 mounted on the gutter 11. Electric signals thus detected are transmitted to a level comparator 35 after being amplified by an amplifier 39, and removing electric noise by a filter 37. When the level comparator 35 detects whether emission of the droplets and charging of the droplets accord or not, and when not accorded, that is disorder in recording may occur, the level comparator 35 emits electric signals which are transmitted to a video signal generating circuit 31 with the phase of electric signals from the clock pulse generator 27 shifted by a phase shift 33. Electric signals including phase detecting signals from the video signal generating circuit 31 are transmitted the charging plate 17, after being amplified by an amplifier 29 to charge the droplets with corrected phase.

Thus, the sensor 15 detects charges impressed on the droplets emitted from the nozzle 1, that is the droplets to be detected and emits the electric signals.

Figure 3:
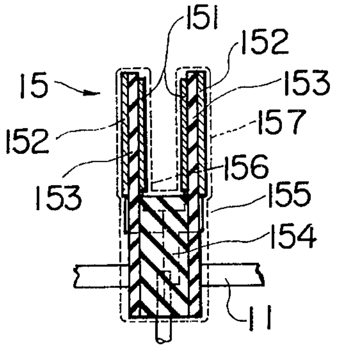
FIG. 3 is a front section view of the sensor.

The sensor 15 is illustrated in FIG. 3 in detail. In FIG. 3, a pair of induction plates 151 are made of conductive material, such as copper, and fixed to a pair of insulators 153 with adhesive material. The pair of insulators 153 carrying the pair of induction plates 151 are secured to an insulator at one end thereof so that the pair of induction plates 151 are in parallel to each other and opposite to each other with a constant separation distance. The induction plates are electrically connected to each other by a wire 156. The pair of induction plates each have conductive plates 152 secured to the insulator 153 at opposite sides from to the induction plates 151. The conductive plates 152 also are electrically connected to each other by a wire 155 which is grounded thereby providing shielding. The sensor 15 is coated on the outside thereof by insulating material as shown by a dotted line.

The sensor 15 is assembled into the ink jet recording apparatus such that the droplets carrying phase detecting signals pass through between the pair of induction plates 151 in non-impinging relation to the induction plates 151. For this, first, ink is emitted so that droplets to be detected fly over the sensor, then the flying path of the droplets to be detected is directed into the space defined by the pair of induction plates from the top of the space. The adjustment of the flying path is made by the screws.

Width l of the sensor 15 is preferably $p(n+3) \sim p(n+7)$, wherein $p$ = a pitch in a series of droplets emitted.

When the droplets are emitted at speed of 20 m/s, frequency of 60 KHZ, the pitch $p$ nearly equals to 0.32 mm.

Figure 4:
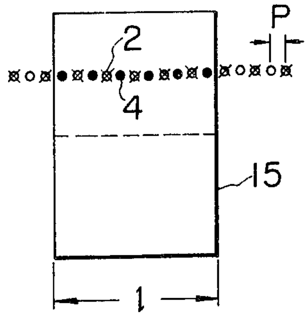
FIG. 4 is a side view of the ink sensor shown in FIG. 3.

$n$ = the number of successively charged droplets to be detected, for example 6 as shown in FIG. 4.

The sensor 15 has current induced therein by the charges impressed on the droplets to be detected flying near or between the pair of induction plates 151 of the sensor 15 and provides electric signals due to the induced current.

The sensor 15 may be employed to the other ink jet recording apparatus for example one described in U.S. Pat. No. 3,836,912 than that described above.

What is claimed is:

1. In an ink jet recording apparatus having means for emitting a series of ink droplets with a constant interval, means for charging the ink droplets in accordance with electric signals including electric signals for detecting disorder in recording, means for deflecting charged droplets in accordance with charges on the charged ink droplets, a recording medium, and sensor means disposed between the deflecting means and the recording medium for sensing the charges on the droplets for detecting disorder in recording and producing electric signals, the improvement on said sensor means comprising induction means including a pair of separated parallel induction plates defining a space through which the ink droplets to be detected pass between in nonimpinging relation with the sensor means, said space having an open portion in a direction perpendicular to the flying path of said ink droplets, means for electrically connecting said pair of induction plates, and means mounted through insulating means at opposite sides of said induction plates from said space for shielding electric noise.

2. The ink jet recording apparatus as defined in claim 1, wherein the separated parallel faces of the induction plates are disposed along the flying path of the droplets for detecting.

3. The ink jet recording apparatus as defined in claim 1, wherein means are provided for adjusting said flying path of said ink droplets in said direction perpendicular to said flying path so that said flying path of said charged ink droplets can be disposed into said space through said open portion.

4. The ink jet recording apparatus as defined in claim 1, wherein said pair of induction plates have a dimension extending in the direction of said flying path, and said open portion is above the separation of said pair of induction plates.

5. The ink jet recording apparatus as defined in claim 1, wherein means responsive to said sensor means are provided to correct phase between emission and charging of said ink droplets.

6. The ink jet recording apparatus as defined in claim 1, wherein the shielding means comprise a pair of conductive plates, and means for electrically connecting the pair of conductive plates, the pair of conductive plates being grounded.

7. The ink jet recording apparatus as defined in claim 6, wherein the pair of induction plates and the pair of conductive plates are coated with insulating material over the entire outside thereof.

8. In an ink jet recording apparatus having a nozzle for emitting ink under pressure, transducer means for receiving electric signals and vibrating the nozzle to make the ink into a series of droplets with a constant interval, means for charging the droplets in accordance with electric signals including video signals and phase detecting signals, deflection means for deflecting the charged droplets in accordance with charges on the droplets, a recording medium, a sensor disposed between the deflection means and the recording means, and a gutter for gathering the ink droplets passed through the sensor, the improvement on the sensor comprising a pair of insulating members, an insulating block securing one end of the pair of insulating members thereto such that the pair of insulating members are in spaced parallel relation to each other, a pair of induction plates each secured to one of the insulating members respectively to be in spaced opposing relation to each other thereby providing therebetween a space defined by the pair of induction plates and being open at ends of said pair of induction plates opposite to said insulating block, the pair of induction plates being electrically connected with each other, and shielding members each of which is secured to each of the pair of insulating members at an opposite side thereof to the induction plate secured thereto, the pair of shielding members being electrically connected to each other and grounded.

9. The ink jet recording apparatus as defined in claim 8; wherein means responsive to said sensor are provided to correct phase between emission and charging of said ink droplets.

10. The ink jet recording apparatus as defined in claim 8, wherein the insulating block is fixed to the gutter.

11. The ink jet recording apparatus as defined in claim 10 wherein the dimension of the sensor in the direction of the flying path of said charged ink droplets is between $p(n+3)$ and $p(n+7)$ wherein $p$ is a pitch of the series of droplets emitted, and $n$ is the number of successively charged droplets being charged with said phase detecting signals.

* * * * *